US012562321B2

(12) United States Patent
Song et al.

(10) Patent No.: US 12,562,321 B2
(45) Date of Patent: Feb. 24, 2026

(54) SEMICONDUCTOR CIRCUIT BREAKER

(71) Applicant: LS ELECTRIC CO., LTD., Anyang-si (KR)

(72) Inventors: Woonghyeob Song, Anyang-si (KR); Jungwook Sim, Anyang-si (KR); Sunghee Kang, Anyang-si (KR); Dongjin Yun, Anyang-si (KR); Jaeho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 194 days.

(21) Appl. No.: 18/281,245

(22) PCT Filed: Feb. 16, 2022

(86) PCT No.: PCT/KR2022/002279

§ 371 (c)(1),
(2) Date: Sep. 8, 2023

(87) PCT Pub. No.: WO2022/211273

PCT Pub. Date: Oct. 6, 2022

(65) Prior Publication Data

US 2024/0297000 A1 Sep. 5, 2024

(30) Foreign Application Priority Data

Mar. 31, 2021 (KR) ........................ 10-2021-0042104

(51) Int. Cl.
*H01H 9/52* (2006.01)
*H01H 9/54* (2006.01)

(52) U.S. Cl.
CPC .............. *H01H 9/52* (2013.01); *H01H 9/548* (2013.01)

(58) Field of Classification Search
CPC .. H05K 7/20909; H05K 7/20; H05K 7/20145; H05K 7/20154; H05K 7/209;
(Continued)

(56) References Cited

U.S. PATENT DOCUMENTS 6,104,602 A * 8/2000 Morris ............... H05K 7/14322 174/16.3
2004/0109293 A1* 6/2004 Apfelbacher ........ H01H 50/021 361/709

FOREIGN PATENT DOCUMENTS

JP 2003338239 A 11/2003
JP 2013078216 A 4/2013
(Continued)

OTHER PUBLICATIONS

Extended European Search Report for related European Application No. 22781394.6; action dated Mar. 21, 2025; (10 pages).
(Continued)

*Primary Examiner* — Ahmed M Saeed
(74) *Attorney, Agent, or Firm* — K&L Gates LLP

(57) ABSTRACT

The present disclosure relates to a semiconductor circuit breaker, and more particularly, to a semiconductor circuit breaker having excellent heat dissipation. The semiconductor circuit breaker according to one embodiment of the present invention comprises: a switching device provided in an upper space of an enclosure; an air gap switch (mechanical switch) provided in the upper space and disposed forward of the switching device; an electric circuit disposed on an upper portion of the switching device; a heatsink provided in a lower space of the enclosure and coupled to a lower portion of the switching device; and a cooling fan provided in the lower space and disposed in a front portion of the enclosure.

6 Claims, 8 Drawing Sheets

(58) Field of Classification Search

CPC ............. H05K 7/2039; H05K 7/20918; H05K 1/0203; H05K 1/147; H05K 1/148; H05K 1/18; H05K 2201/064; H05K 2201/066; H05K 3/4691; H05K 7/1417; H05K 7/14325; H05K 7/1461; H05K 7/1492; H05K 7/20136; H05K 7/20336; H05K 7/20409; H05K 7/20545; H05K 7/20581; H05K 7/207; H01H 9/52; H01L 23/467; H01L 23/3672; H01L 21/4882; H01L 23/3675

See application file for complete search history.

(56) References Cited

FOREIGN PATENT DOCUMENTS

| | | | |
|---|---|---|---|
| JP | 2015050929 | A | 3/2015 |
| JP | 2016093072 | A | 5/2016 |
| KR | 101189451 | B1 | 10/2012 |
| KR | 20150011176 | A | 1/2015 |
| KR | 101800048 | B1 | 11/2017 |
| KR | 101832868 | B1 | 2/2018 |
| WO | 2020252121 | A1 | 12/2020 |

OTHER PUBLICATIONS

International Search Report for related International Application No. PCT/KR2022/002279; action dated Oct. 6, 2022; (2 pages).
Written Opinion for related International Application No. PCT/KR2022/002279; action dated Oct. 6, 2022; (4 pages).
Office Action for related Japanese Application No. 2023-552370; action dated Aug. 27, 2024; (5 pages).

* cited by examiner

SEMICONDUCTOR CIRCUIT BREAKER

CROSS-REFERENCE TO RELATED APPLICATION

This application is the National Stage filing under 35 U.S.C. 371 of International Application No. PCT/KR2022/002279, filed on Feb. 16, 2022, which claims the benefit of earlier filing date of and rights of priority to Korean Application 10-2021-0042104, filed on Mar. 31, 2021, the contents of which are all hereby incorporated by reference herein in their entirety.

FIELD

The present disclosure relates to a semiconductor circuit breaker, and more particularly, to a semiconductor circuit breaker having excellent heat dissipation.

BACKGROUND

Generally, a semiconductor circuit breaker is a circuit breaker designed to break a circuit using a semiconductor switch such as a metal oxide semiconductor field effect transistor (MOSFET), an insulated gate bipolar transistor (IGBT), etc.

As a semiconductor switch device is applied to a circuit breaker used in a power device, the semiconductor circuit breaker has such an advantage that breaking time is remarkably improved and a structure is simplified. In addition, since the semiconductor circuit breaker breaks a circuit using current blocking characteristics of a semiconductor switch, an arc is not generated during circuit breaking, and thus, a function of removing arcs is not needed. Accordingly, an arc distinguishing portion is not included, and thus, a volume may be reduced.

On the other hand, in a case of a low-capacity circuit breaker, use of a semiconductor switch may increase a manufacture cost.

The semiconductor circuit breaker is frequently used in a system that needs quick circuit breaking. Compared to a general mechanical circuit breaker with a breaking speed of about several to hundreds of ms, the semiconductor circuit breaker may have a breaking speed of about tens of μs, to thereby block current within a much shorter time.

Accordingly, the semiconductor circuit breaker tends to be actively utilized in a distribution panel having a large current capacity, a direct current (DC) distribution system with a high increasing rate of fault current, an energy storage system (ESS) which requires stable current supply or blocking, or the like. Recently, a battery energy storage system (BESS) using a battery as energy is widely used in electric vehicles, etc. However, considering recent occurrence of ignition in the ESS system, etc., importance of a circuit breaker for stable supply of current in consideration of heating is increasingly emphasized.

Meanwhile, a protection circuit (safety circuit) or a safety element is applied to the semiconductor circuit breaker to protect a semiconductor from a damage due to a voltage generated during semiconductor switching. As an example of such a protection circuit, a snubber circuit is used. Likewise, a power semiconductor circuit breaker also needs the protection circuit such as the snubber circuit to lower a voltage generated during switching.

In addition, according to a system, a metal oxide varistor (MOV) may be additionally included as the protective element. The MOV is one of components used for surge protection, and applied to a part of a circuit to prevent a damage caused to an electric/electronic device by a surge. The MOV is a varistor including zinc oxide, and functions as a transient voltage blocking device through which current flows when an electric potential equal to or greater than a constant value is generated. According to application of this device, a separate inner fuse is not needed.

The semiconductor circuit breaker generally has a composite structure including a mechanical circuit breaker and an electronic circuit breaker. That is, the semiconductor circuit breaker does include not only a semiconductor switch, but also a mechanical switch (air gap switch) to mechanically (physically) disconnect a circuit by using an auxiliary method.

Meanwhile, the semiconductor circuit breaker is mainly applied to a direct current (DC) power supply circuit. In this case, the DC circuit breaker has such an advantage that positions of a power source and a load may be easily set.

As illustrated in FIG. 1, when the DC circuit breaker is disposed in a system or a circuit in a positional order such as 'the DC power source 3→the DC circuit breaker 2→the load 1 (Case a), current flows from left to right as illustrated in the drawing.

In addition, when a DC circuit breaker is disposed in a system or a circuit in a positional order such as 'a load 1→a DC circuit breaker 2→a DC power source 3 (Case b), current flows from right to left as illustrated in the drawing.

Further, the DC circuit breaker may be equipped in a circuit in which current bidirectionally flows (Case c). That is, a first power source 4 and a second power source 5 are disposed at front and rear ends of the DC circuit breaker 2, respectively. Here, the first power source 4 or the second power source 5 may be configured as batteries.

FIG. 2 is a perspective view of a semiconductor circuit breaker. The semiconductor circuit breaker includes a switching device 6 and an air gap switch 7. Here, the switching device 6 includes a power semiconductor switch, and the air gap switch refers to a mechanical switch. A heatsink 8 and a heat dissipation fan 9 are disposed below the switching device 6 and the air gap switch 7 to perform cooling.

In a case of the mechanical switch (air gap switch), great heat is generated from a contact portion during circuit breaking. Thus, since heat is discharged to a periphery, the heat needs to be cooled, and a configuration for efficient cooling is needed.

Meanwhile, such heat dissipation needs to be efficiently performed in a limited space of the semiconductor circuit breaker. Thus, since it is desirable to reduce a size of the semiconductor circuit breaker, the semiconductor circuit breaker may be configured to occupy a small space and have efficient heat dissipation performance.

In addition, convenience of maintenance needs to be considered. The semiconductor circuit breaker needs to be manufactured by taking into account a need for maintenance of components such as a switching device, an air gap switch, a heatsink, etc.

SUMMARY

Therefore, to obviate those problems, an aspect of the detailed description is to provide a semiconductor circuit breaker having efficient cooling performance.

In addition, an aspect of the detailed description is to provide a direct current (DC) circuit breaker having a small occupying space and enhanced heat dissipation characteristics.

In addition, an aspect of the detailed description is to provide a semiconductor circuit breaker configured such that components are detachably equipped to facilitate maintenance.

To achieve these and other advantages and in accordance with the purpose of the present disclosure, as embodied and broadly described herein, there is provided a semiconductor circuit breaker including: a switching device provided in an upper space of an enclosure; an air gap switch (mechanical switch) provided in the upper space and disposed forward or rearward of the switching device; a heatsink disposed in a lower space of the enclosure and coupled to a lower portion of the switching device; and a cooling fan disposed in the lower space and disposed in a front portion of the enclosure.

Here, a base plate may be included between the upper space and the lower space.

The semiconductor circuit breaker may further include an electric circuit disposed on an upper portion of the switching device.

The switching device, the air gap switch, and the electric circuit may be detachably equipped in an upper portion of the base plate, and the heatsink and the cooling fan may be detachably equipped in a lower portion of the base plate.

The enclosure may have a first ventilation disposed in an upper rear portion, a second ventilation hole disposed in a lower rear portion, and a third ventilation hole disposed in a lower front portion.

A plurality of upper and lower ventilation holes may be disposed in a periphery of the base plate.

The base plate may be disposed to have a larger area than an area of the air gap switch, and the upper and lower ventilation holes may be disposed adjacent to the air gap switch or adjacent to the cooling fan.

The upper and lower ventilation holes may be disposed in a front portion of the base plate, but not disposed in a rear portion of the base plate.

The base plate may be made of aluminum (Al).

In the semiconductor circuit breaker according to one embodiment of the present disclosure, a heatsink and a cooling fan are positioned below a switching device and an air gap switch to thereby have a great cooling effect.

Here, an enclosure includes a base plate to be divided into an upper space and a lower space. Thus, inner components are disposed at two levels in the enclosure, and an occupying area of the enclosure viewed from above is decreased.

In addition, the switching device and the air gap switch are positioned in the upper space, and the heatsink and the cooling fan are positioned in the lower space to efficiently divide the occupying space In addition, a plurality of upper and lower ventilation holes are positioned in the base plate so that air flowing through the upper space and air flowing through the lower space are exchanged from each other to thereby increase a cooling effect.

In addition, since the upper and lower ventilation holes are positioned only in a front portion of the base plate, air flows toward a front portion in which the air gap switch is disposed to thereby increase a cooling effect.

Further, the switching device and the air gap switch are detachably equipped in an upper portion of the base plate, and the heatsink and the cooling fan are detachably equipped in a lower portion of the based plate to thereby facilitate maintenance.

DETAILED DESCRIPTION

Hereinafter, preferred embodiments of the present disclosure will be described with reference to the accompanying drawings, so that a person skilled in the art can easily carry out the disclosure. It should be understood that the technical idea and scope of the present disclosure are not limited to those preferred embodiments.

Hereinafter, a semiconductor circuit breaker in accordance with each embodiment of the present disclosure will be described in detail with reference to the accompanying drawings.

First Embodiment

Figure 1:
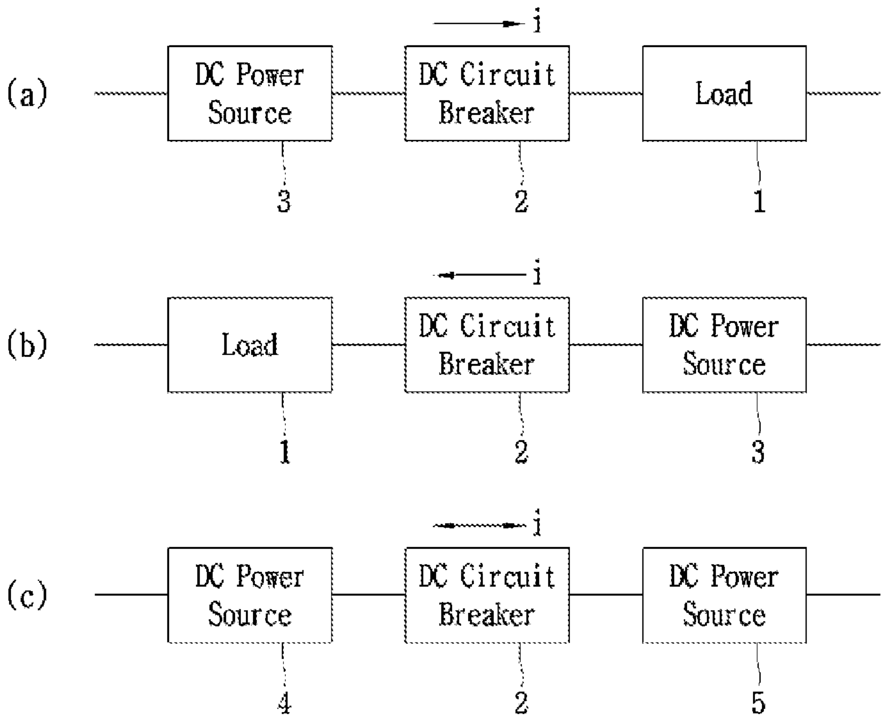
FIG. 1 is a configuration diagram of a direct current (DC) circuit breaker according to the related art.
Figure 2:
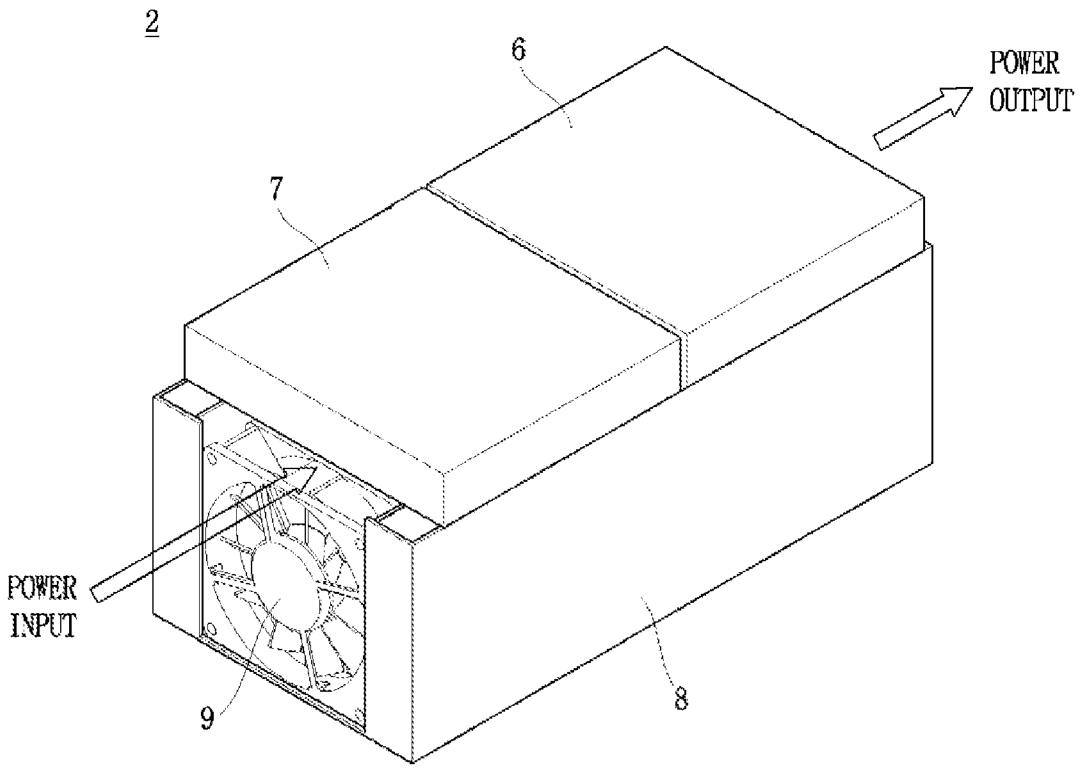
FIG. 2 is a perspective view of the semiconductor circuit breaker according to the related art.
Figure 3:
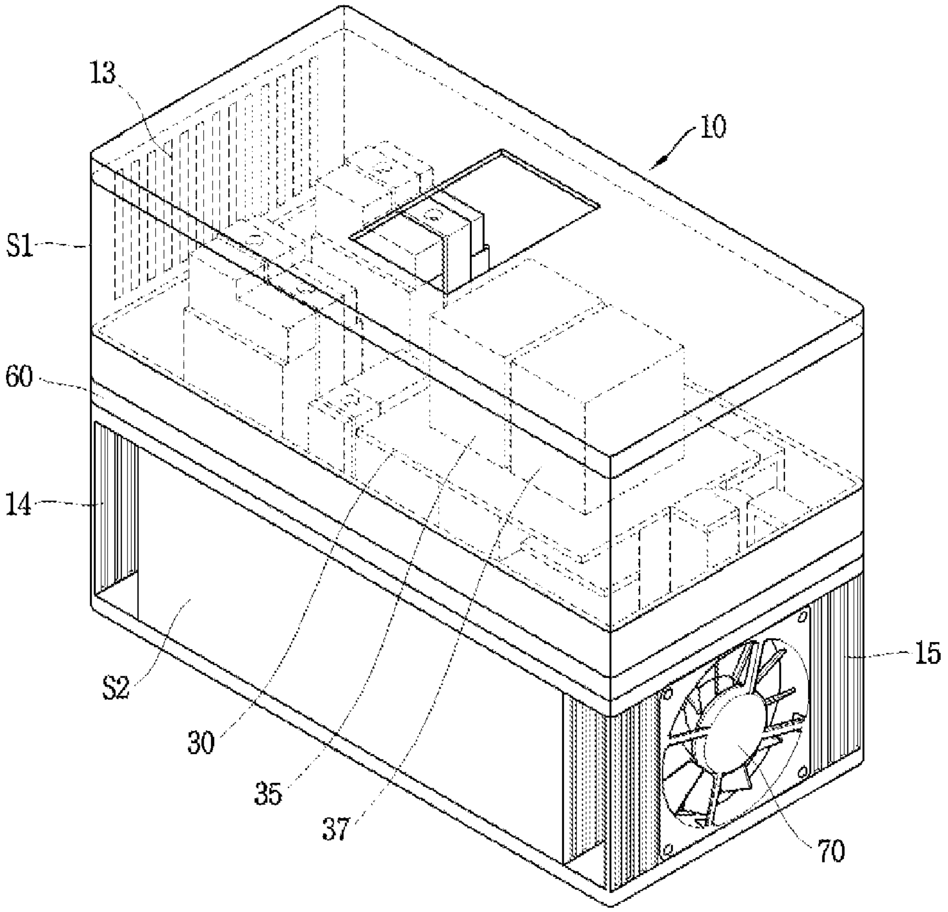
FIGS. 3 and 4 are a perspective view and a side view of a semiconductor circuit breaker according to one embodiment of the present disclosure, respectively.
Figure 4:
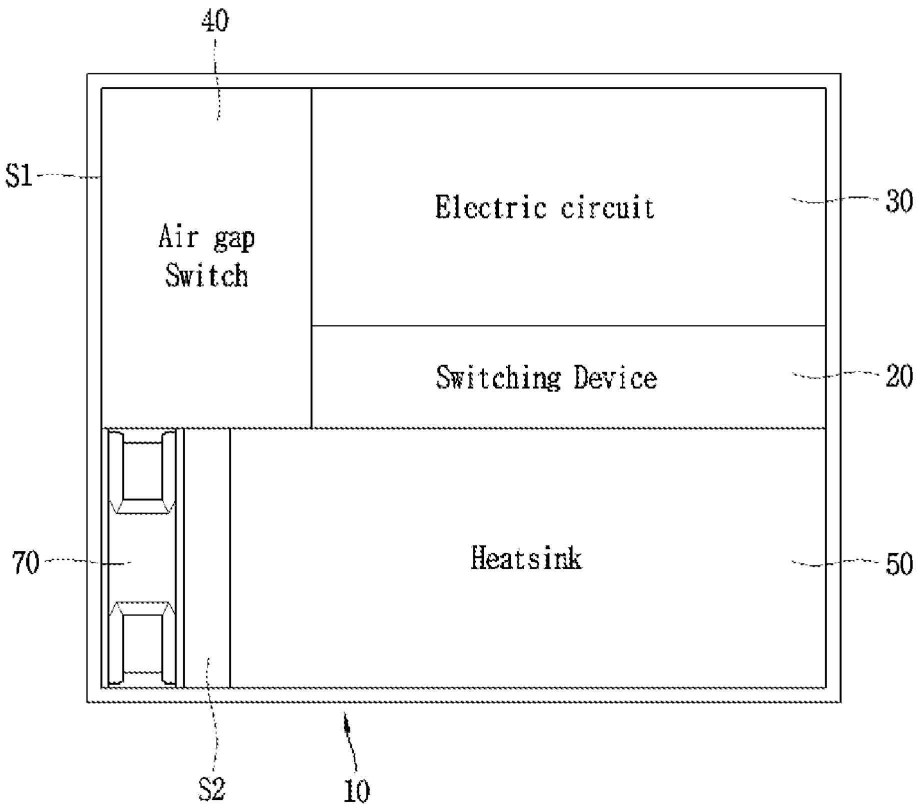
Figure 5:
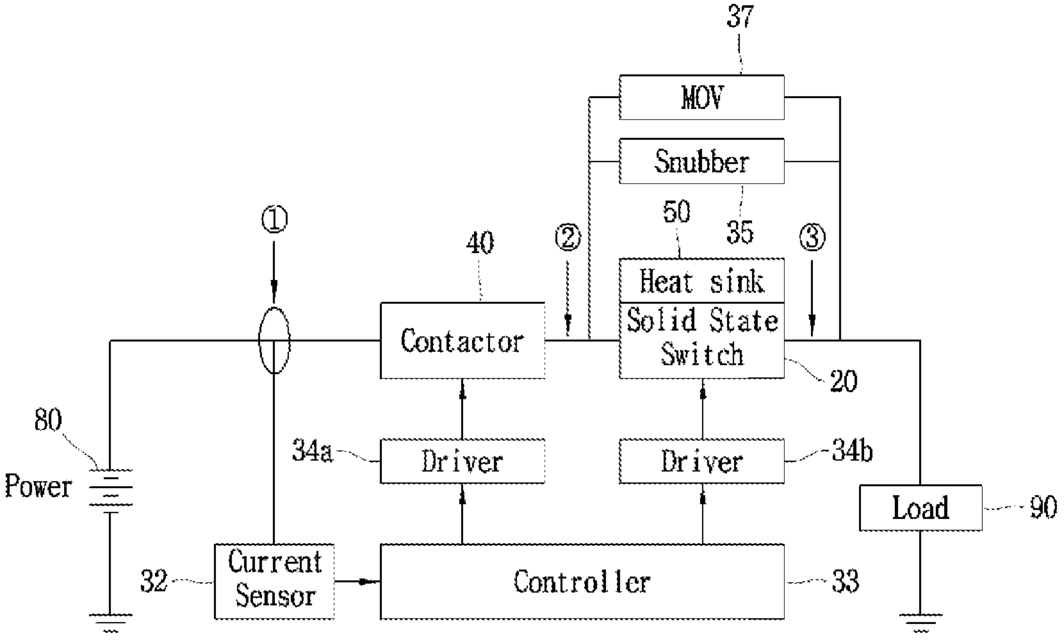
FIG. 5 is a circuit diagram of the semiconductor circuit breaker according to one embodiment of the present disclosure.

FIG. 3 is a perspective view of a semiconductor circuit breaker according to one embodiment of the present disclosure, and FIG. 4 is a cross-sectional view of an internal configuration of the semiconductor circuit breaker of FIG. 3. FIG. 5 illustrates a circuit configuration diagram.

The semiconductor circuit breaker according to one embodiment of the present disclosure includes: a switching device 20 provided in an upper space S1 of an enclosure 10; an air gap switch 40 (mechanical switch) provided in the upper space S1 and disposed forward or rearward of the switching device 20; an electric circuit 30 disposed on an upper portion of the switching device 20; a heatsink 50 provided in a lower space S2 of the enclosure 10 and coupled to a lower portion of the switching device 20; and a cooling fan 70 provided in the lower space S2 and disposed in a front portion of the enclosure 10.

The enclosure 10 may have a shape of, approximately, a rectangular parallelepiped box. The enclosure 10 may be manufactured of an insulating material such as a synthetic resin material, etc. to be insulated from outside. The enclosure 10 supports and protects inner components from outside.

An inner portion of the enclosure 10 is divided into two levels including the upper space S1 and the lower space S2.

The enclosure 10 is configured to have a ventilation hole in a front surface or a rear surface. FIG. 3 illustrates a first ventilation hole 13 disposed in an upper rear portion of the enclosure and a second ventilation hole 14 disposed in a lower rear portion of the enclosure 10. A third ventilation hole 15 may be disposed in a lower front portion of the enclosure 10.

Hereinafter, components disposed in the upper space S1 will be described.

A switching device 20 is disposed in the upper space S1. The switching device 20 includes a power semiconductor switch. A metal oxide semiconductor field effect transistor (MOSFET), an insulated gate bipolar transistor (IGBT), or the like may be applied as the power semiconductor switch.

The power semiconductor switch is frequently used in a system that needs quick circuit breaking. Compared to a general mechanical circuit breaker with a breaking speed of about several to hundreds of ms, the semiconductor circuit breaker may have a breaking speed of about tens of μs, to thereby block current within a much shorter time.

Accordingly, the semiconductor circuit breaker may be applied to a distribution panel having a large current capacity, a direct current (DC) distribution system with a high increasing rate of fault current, an energy storage system (ESS) which requires stable current supply or blocking, or the like.

The electric circuit 30 is disposed on an upper portion of the switching device 20. Alternatively, the switching device 20 may be equipped in a part of the electric circuit 30.

The electric circuit 30 includes a gate driver (not shown), a controller 33, a snubber 35, a metal oxide varistor (MOV) 37, a transient voltage suppressor (TVS), etc.

The gate driver applies a voltage needed by the switching device 20. To do so, a separate power supply circuit and a current buffer may be included. The gate driver may be referred to as a driving driver.

The gate driver also electrically transmits a signal between a high-voltage power supply circuit and a low-voltage control circuit (in an insulated state). Accordingly, the gate driver provides high safety and reliability for driving a semiconductor switch.

The controller 33 connects and controls respective portions in a circuit. The controller 33 may determine overcurrent or fault current according to a magnitude of current transmitted from a current sensor 32, and accordingly, operate the switching device 20 and the air gap switch 40. The controller 33 may operate the air gap switch 40 through a first driver 34*a*, and operate the switching device 20 through a second driver 34*b* (refer to FIG. 5).

Figure 6:
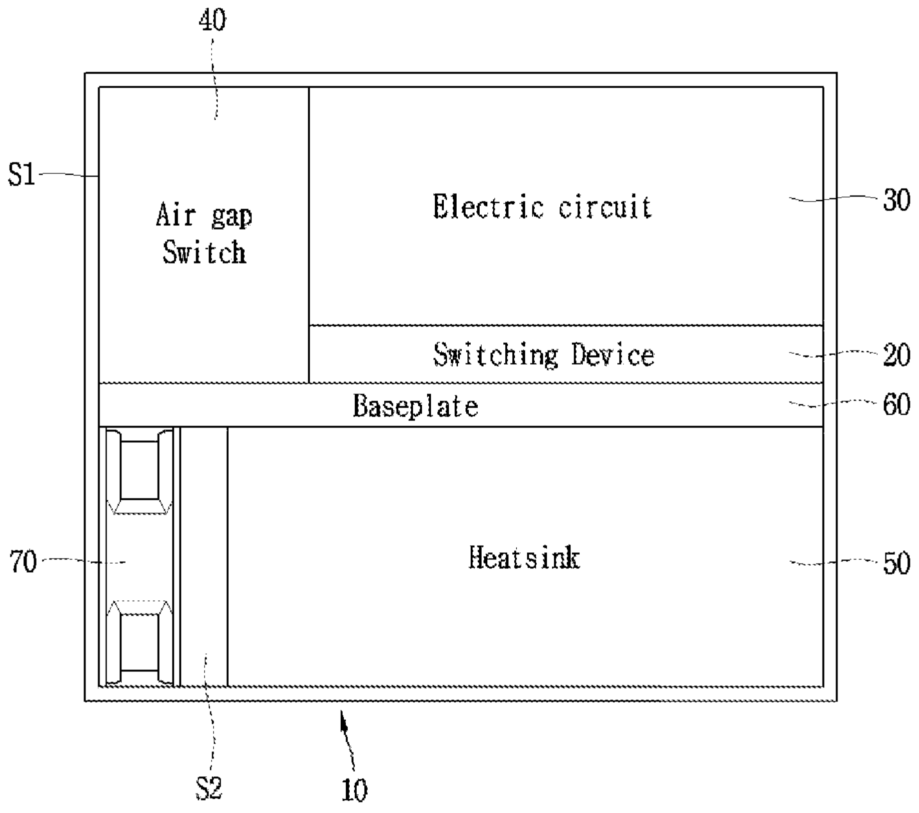
FIG. 6 is a side view of a semiconductor circuit breaker according to another embodiment of the present disclosure.

Here, the current sensor 32 is equipped in a part of a main circuit. In FIG. 6, the current sensor 32 may be disposed in any of positions (1), 2, and 3. That is, the current sensor 32 may be disposed at a front end or a rear end of the air gap switch 40, or a front end or a rear end of the switching device 20.

In a case of a semiconductor circuit breaker, a protection circuit (safety circuit) or a safety element is applied to protect a semiconductor switch from a damage caused by a high voltage generated during semiconductor switching. As an example of such a protection circuit, a snubber circuit is used. In the semiconductor circuit breaker, the protection circuit generally protects the semiconductor switch by lowering a voltage generated during switching.

An example of the snubber circuit may include a capacitor (C) snubber circuit, a resistor-capacitor (RC) snubber circuit, and a charge-discharge type resistor-capacity-diode (RCD) snubber circuit, a discharge-suppressing type snubber circuit, etc.

In addition, according to a system, the metal oxide varistor (MOV) 37 may be additionally configured as the safety element. The MOV 37 is one of components used for surge protection, and applied to a part of a circuit to prevent a damage caused to a semiconductor switch by a surge voltage. The MOV is a varistor including zinc oxide, and functions as a transient voltage blocking device through which current flows when an electric potential equal to or greater than a set value is generated. When an MOV device is applied, there is no need to additionally equip a fuse in a circuit.

The aforementioned protective circuits or safety elements may be provided as protective modules detachably attached to the electric circuit 30. When a protective device is independently configured as a protective module, maintenance may be facilitated. That is, when a failure occurs in the protective module, only the protective module may be replaced.

The air gap switch 40 is disposed. The air gap switch 40 is a mechanical switch. The air gap switch 40 may be configured as a general mechanical switch having a contact portion including a fixed contact point and a movable contact point. When the air gap switch 40 is electrically connected, the movable contact point is connected to the fixed contact point, and when the air gap switch 40 is electrically disconnected, the movable contact point is apart from the fixed contact point to mechanically disconnect a circuit. Since DC current does not pass through a zero point, when small current flows in a circuit, a case when current blocking is difficult may occur. In this case, the circuit may need to be mechanically cut off to completely block current.

The air gap switch 40 is disposed forward or rearward of the switching device 20. Here, the air gap switch 40 may be preferably disposed adjacent to a power source 80. This may protect a blocking unit, other components, and a load 90 by separating a circuit from a periphery of the power source when the current is blocked.

Heat is greatly generated from a contact portion of the air gap switch 40. Accordingly, a device configured to cool heat in the air gap switch 40 and the switching device 20 is needed.

The heatsink 50 is disposed below the switching device 20 and the air gap switch 40. The heatsink 50 may be applied by using an air-cooled or water-cooled cooling method. The heatsink 50 may be manufactured of an inexpensive material having an excellent thermal conductivity rate such as aluminum (Al), copper (Cu), etc.

The heatsink 50 may have a form in which a plurality of fins protrude so that an area of contact with air is enlarged.

The cooling fan 70 is disposed on a front surface or a rear surface of the enclosure 10. The cooling fan 70 generates a flow of air so that components inside the enclosure 10 are cooled by the air. The cooling fan 70 allows air to flow from inside to outside of the enclosure 10 to discharge heat inside the enclosure 10 to the outside as illustrated in FIG. 8, or allows air to flow from outside to inside of the enclosure 10 so that cool air from the outside flows to the inside as illustrated in FIG. 9.

Figure 8:
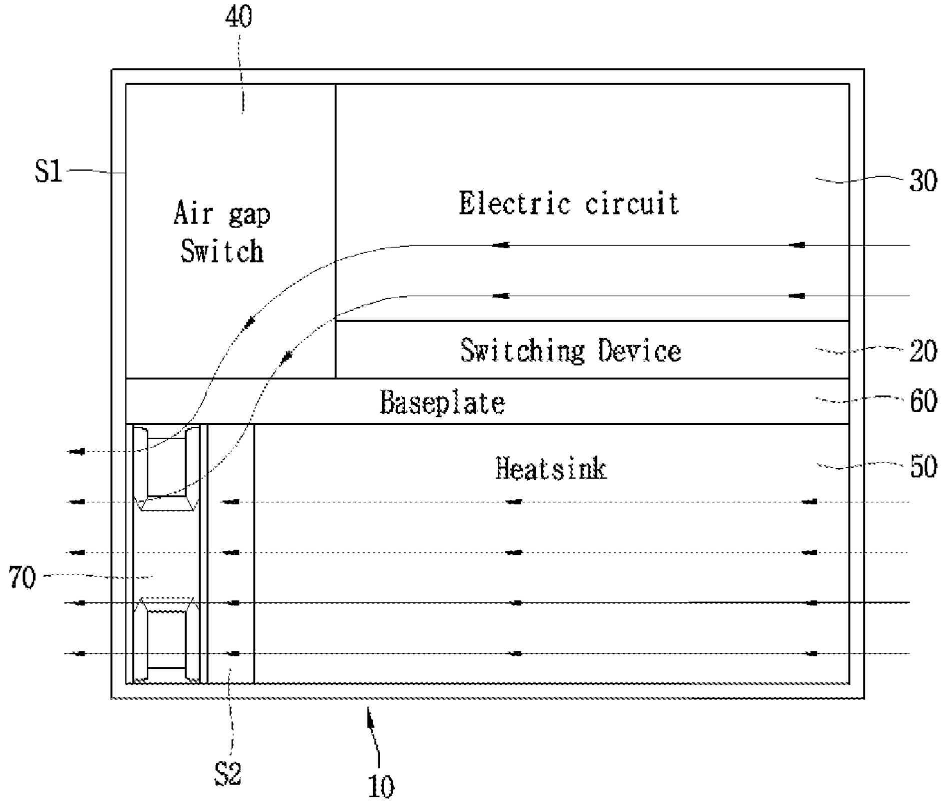
FIGS. 8 and 9 illustrate an intake state and an exhaust state of the semiconductor circuit breaker according to one embodiment of the present disclosure, respectively.
Figure 9:
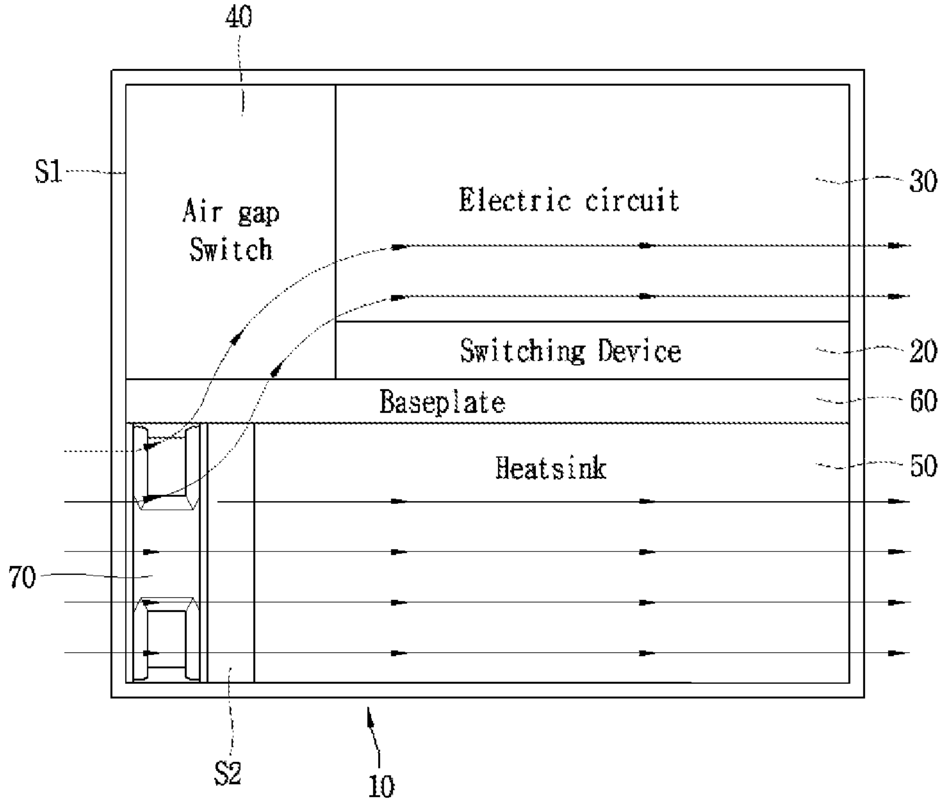

Hereinafter, a case as illustrated in FIG. 8, i.e., a case when the cooling fan 70 functions to allow air to flow from inside to outside of the enclosure 10 is to be described. In the lower space S2, a flow in which air is introduced through the second ventilation hole 14 in a rear surface of the enclosure 10, and then, escapes through the cooling fan 70 via the heatsink 50 is generated.

In the upper space S1, a flow in which air is introduced through the first ventilation hole 13 in a rear surface of the enclosure 10, moves into the lower space S2 via an empty space around the air gap switch 40, and then, escapes through the cooling fan 70 is generated.

Heat inside the enclosure 10 is discharged to outside of the enclosure 10 by the heatsink 50 and the cooling fan 70, thus increasing a cooling effect.

In addition, since the air gap switch 40 which generates a great amount of heat is directly cooled by air introduced by the cooling fan 70, a cooling effect is increased.

Then, a case as illustrated in FIG. 9, i.e., a case when the cooling fan 70 allows air to flow from outside to inside of the enclosure 10 is to be described. In the lower space S2, a flow in which air is introduced through the third ventilation hole 15 in a front surface of the enclosure 10 or by the cooling fan 70, and then, escapes through the second ventilation hole 14 in the rear surface of the enclosure 10 via the heatsink 50 is generated.

In the upper space S1, a flow in which air is introduced through the third ventilation hole 15 in a front surface of the enclosure 10 or by the cooling fan 70, moves into the upper space S1 via an empty space around the air gap switch 40, and then, escapes through the first ventilation hole 13 in the rear surface of the enclosure 10 is generated.

Heat inside the enclosure 10 is dissipated by air introduced from outside of the enclosure 10 by the heatsink 50 and the cooling fan 70, thus increasing a cooling effect.

In addition, since the air gap switch 40 which generates a great amount of heat is directly cooled by air introduced by the cooling fan 70, a cooling effect is increased.

Second Embodiment

Figure 7:
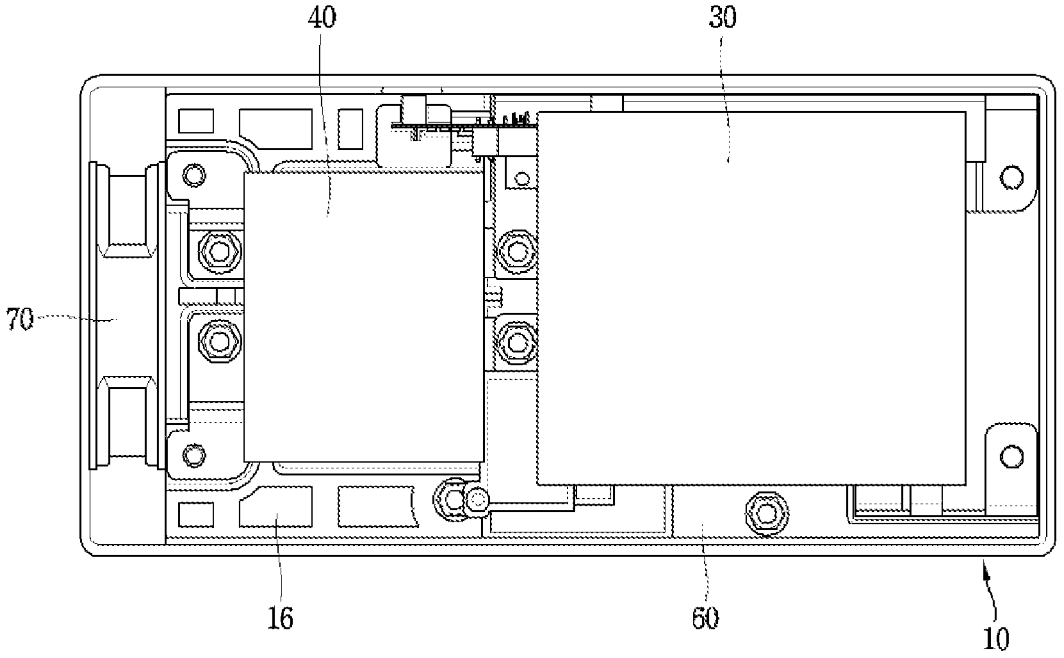
FIG. 7 is a top view of the semiconductor circuit breaker of FIG. 6.

Referring to FIG. 6 or 7, this embodiment is to be described. In this embodiment, a base plate 60 is added to a configuration of the embodiments described above. Other than descriptions about configurations to be added, the description about the embodiments described above may be applied to this embodiment identically.

The base plate 60 is prepared. The base plate 60 is disposed in a middle portion in a vertical direction inside the enclosure 10. Accordingly, inside of the enclosure 10 is divided into the upper space S1 and the lower space S2 by the base plate 60.

The switching device 20, the electric circuit 30, the air gap switch 40, etc. are disposed in the upper space S1. The switching device 20, the electric circuit 30, and the air gap switch 40 may be detachably equipped in an upper portion of the base plate 60. For example, the switching device 20, the electric circuit 30, and the air gap switch 40 may be screw-coupled to an upper portion of the base plate 60.

The base plate 60 may have a form of a flat plate. The base plate 60 may be coupled to the enclosure 10. The base plate 60 may be coupled to inside of the enclosure 10.

Although not illustrated separately, as an applicable embodiment, the enclosure 10 may be divided into two enclosures coupled to upper and lower portions of the base plate 60, respectively. That is, the enclosure 10 may be divided into an upper enclosure coupled to the upper portion of the base plate 60 and a lower enclosure coupled to the lower portion of the base plate 60.

The base plate 60 may be manufactured of a material having an excellent thermal conductivity rate such as aluminum, etc. Accordingly, a function as a heat transfer path via which heat generated from the switching device 20 or the air gap switch 40 in the upper space S1 is transferred to the heatsink 50 in the lower space S2 may be performed. Also, a function of discharging heat generated from the switching device 20 or the air gap switch 40 in the upper space S1 may be performed.

A top view is illustrated in FIG. 7. When the semiconductor circuit breaker is viewed from above, an area of the base plate 60 is provided to be larger than that of an inner component such as the switching device 20, the air gap switch 40, etc. Accordingly, the base plate 60 protrudes respectively from front, rear, left, and right surfaces of the inner components such as the switching device 20, the air gap switch 40, etc.

The heatsink 50 is coupled to a lower portion of the base plate 60. The heatsink 50 is detachably coupled to the base plate 60. For example, the heatsink 50 is screw-coupled to the base plate 60.

As respective components of the semiconductor circuit breaker are detachably coupled to an upper or lower portion of the base plate 60, maintenance may be easily performed.

A plurality of upper and lower ventilation holes 16 are disposed in a periphery of the base plate 60. When viewed from above, the upper and lower ventilation holes 16 are disposed adjacent to the components such as the air gap switch 40, the cooling fan 70, etc. Air flows between the upper space S1 and the lower space S2 via the upper and lower ventilation holes 16.

Meanwhile, the upper and lower ventilation holes 16 are disposed only forward of the base plate 60, but not rearward of the base plate 60. Here, being forward and rearward refer to being in front and rear, respectively, of the base plate 60 when the base plate 60 is divided with reference to a middle portion in a longitudinal direction.

As the upper and lower ventilation holes 16 are disposed only forward of the base plate 60, air sucked into the upper space S1 by the cooling fan 70 moves forward to flow along a periphery of the air gap switch 40, and then, flows into the lower space S2 along the upper and lower ventilation holes 16. Accordingly, an effect of cooling the air gap switch 40 is enhanced.

Hereinafter, a case as illustrated in FIG. 8, i.e., a case when the cooling fan 70 functions to allow air to flow from the inside to the outside of the enclosure is to be described. In the lower space S2, a flow in which air is introduced 10 through the second ventilation hole 14 in a rear surface of the enclosure 10, and then, escapes through the cooling fan 70 via the heatsink 50 is generated.

In the upper space S1, a flow in which air is introduced from the first ventilation hole 13 disposed in a rear surface of the enclosure 10 and drawn into a periphery of the air gap switch 40 disposed forward, then, moves into the lower space S2 via the upper and lower ventilation holes 16 around the air gap switch 40, and then, escapes through the cooling fan 70 is generated.

Heat inside the enclosure 10 is discharged to outside of the enclosure 10 by the heatsink 50 and the cooling fan 70, thus increasing a cooling effect.

In addition, since the air gap switch 40 which generates a great amount of heat is directly cooled by air introduced by the cooling fan 70, a cooling effect is increased.

Then, a case as illustrated in FIG. 9, i.e., the case when the cooling fan 70 functions to allow air to flow from outside to inside of the enclosure 10 is to be described. In the lower space S2, a flow in which air is introduced through the third ventilation hole 15 in a front surface of the enclosure 10 or by the cooling fan 70, and then, escapes through the second ventilation hole 14 in the rear surface of the enclosure 10 via the heatsink 50 is generated.

In the upper space S1, a flow in which air is introduced through the third ventilation hole 15 in a front surface of the enclosure 10 or introduced by the cooling fan 70, moves into the upper space S1 via the upper and lower ventilation holes 16 around the air gap switch 40, and then, escapes through the first ventilation hole 13 in the rear surface of the enclosure 10 is generated.

Heat inside the enclosure 10 is dissipated by air introduced from outside of the enclosure 10 by the heatsink 50 and the cooling fan 70, thus increasing a cooling effect.

In addition, since the air gap switch 40 which generates a great amount of heat is directly cooled by air introduced by the cooling fan 70, a cooling effect is increased.

In the semiconductor circuit breaker according to one embodiment of the present disclosure, a heatsink and a cooling fan are positioned below a switching device and an air gap switch to thereby improve a cooling effect.

Here, an enclosure includes a base plate to be divided into an upper space and a lower space. Thus, inner components are disposed at two levels in the enclosure, and an occupying area of the enclosure viewed from above is decreased.

In addition, the switching device and the air gap switch are positioned in the upper space, and the heatsink and the cooling fan are positioned in the lower space to efficiently divide an occupying space.

In addition, a plurality of upper and lower ventilation holes are positioned in the base plate so that air flowing through the upper space and air flowing through the lower space are exchanged from each other to thereby increase a cooling effect.

In addition, since the upper and lower ventilation holes are positioned only in a front portion of the base plate, air flows toward a front portion in which the air gap switch is disposed to thereby increase a cooling effect.

Further, the switching device and the air gap switch are detachably equipped in an upper portion of the base plate, and the heatsink and the cooling fan are detachably equipped in a lower portion of the based plate to thereby facilitate maintenance.

While the disclosure has been shown and described with reference to the foregoing preferred implementations thereof, it will be understood by those skilled in the art that various changes and modifications may be made without departing from the scope of the disclosure as defined by the appended claims. Therefore, the implementation disclosed in the present disclosure are not intended to limit the scope of the present disclosure but are merely illustrative, and it should be understood that the scope of the technical idea of the present disclosure is not limited by those implementations. That is, the scope of protection of the present disclosure should be construed according to the appended claims, and all technical ideas within the scope of equivalents thereof should be construed as being included in the scope of the present disclosure.

The invention claimed is:

1. A semiconductor circuit breaker comprising:

a switching device provided in an upper space of an enclosure;

an air gap switch (mechanical switch) provided in the upper space and disposed forward or rearward of the switching device;

a heatsink disposed in a lower space of the enclosure and coupled to a lower portion of the switching device;

a cooling fan disposed in the lower space and disposed in a front portion of the enclosure;

a base plate comprised between the upper space and the lower space;

an electric circuit disposed on an upper portion of the switching device, wherein the switching device, the air gap switch, and the electric circuit are detachably equipped in an upper portion of the base plate, and the heatsink and the cooling fan are detachably equipped in a lower portion of the base plate.

2. The semiconductor circuit breaker of claim 1, wherein the enclosure has a first ventilation disposed in an upper rear portion, a second ventilation hole disposed in a lower rear portion, and a third ventilation hole disposed in a lower front portion.

3. The semiconductor circuit breaker of claim 2, wherein a plurality of upper and lower ventilation holes are disposed in a periphery of the base plate.

4. The semiconductor circuit breaker of claim 3, wherein the base plate are disposed to have a larger area than an area of the air gap switch, and the upper and lower ventilation holes are disposed adjacent to the air gap switch or adjacent to the cooling fan.

5. The semiconductor circuit breaker of claim 4, wherein the upper and lower ventilation holes are disposed in a front portion of the base plate, but not disposed in a rear portion of the base plate.

6. The semiconductor circuit breaker of claim 2, wherein the base plate is made of aluminum (Al).

* * * * *